United States Patent
Colgrove et al.

(10) Patent No.: US 9,423,967 B2
(45) Date of Patent: Aug. 23, 2016

(54) SCHEDULING OF I/O WRITES IN A STORAGE ENVIRONMENT

(71) Applicant: Pure Storage, Inc., Mountain View, CA (US)

(72) Inventors: John Colgrove, Los Altos, CA (US); John Hayes, Mountain View, CA (US); Bo Hong, Mountain View, CA (US); Feng Wang, Sunnyvale, CA (US); Ethan Miller, Santa Cruz, CA (US); Craig Harmer, San Francisco, CA (US)

(73) Assignee: Pure Storage, Inc., Mountain View, CA (US)

( * ) Notice: Subject to any disclaimer, the term of this patent is extended or adjusted under 35 U.S.C. 154(b) by 0 days.

(21) Appl. No.: 14/715,552

(22) Filed: May 18, 2015

(65) Prior Publication Data

US 2015/0254004 A1    Sep. 10, 2015

Related U.S. Application Data

(63) Continuation of application No. 14/160,169, filed on Jan. 21, 2014, now Pat. No. 9,037,827, which is a continuation of application No. 13/919,151, filed on Jun. 17, 2013, now Pat. No. 8,645,657, which is a continuation of application No. 12/882,877, filed on Sep. 15, 2010, now Pat. No. 8,468,318.

(51) Int. Cl.
*G06F 12/00* (2006.01)
*G06F 3/06* (2006.01)
(Continued)

(52) U.S. Cl.
CPC ............... *G06F 3/0611* (2013.01); *G06F 3/06* (2013.01); *G06F 3/061* (2013.01); *G06F 3/0613* (2013.01);
(Continued)

(58) Field of Classification Search
CPC . G06F 12/0238; G06F 12/0246; G06F 12/08; G06F 12/0802; G06F 3/06; G06F 3/061; G06F 3/0611; G06F 3/0613; G06F 3/0689
See application file for complete search history.

(56) References Cited

U.S. PATENT DOCUMENTS

| 6,041,366 A | 3/2000 | Maddalozzo, Jr. et al. |
| 6,157,963 A | 12/2000 | Courtright, II et al. |

(Continued)

FOREIGN PATENT DOCUMENTS

| JP | 2006-251844 A | 9/2006 |
| WO | WO 2010071655 A1 * | 6/2010 |

OTHER PUBLICATIONS

The International Search Report and the Written Opinion received from the International Searching Authority (ISA) for International Application No. PCT/US2011/051752, dated Nov. 30, 2011, 12 pages.

*Primary Examiner* — Shawn X Gu
(74) *Attorney, Agent, or Firm* — Edward J. Lenart; Kennedy Lenart Spraggins LLP

(57) ABSTRACT

A system and method for scheduling read and write operations among a plurality of solid-state storage devices. A computer system comprises client computers and data storage arrays coupled to one another via a network. A data storage array utilizes solid-state drives and Flash memory cells for data storage. A storage controller within a data storage array comprises an I/O scheduler. The data storage controller is configured to receive requests targeted to the data storage medium, said requests including a first type of operation and a second type of operation. The controller is further configured to schedule requests of the first type for immediate processing by said plurality of storage devices, and queue requests of the second type for later processing by the plurality of storage devices. Operations of the first type may correspond to operations with an expected relatively low latency, and operations of the second type may correspond to operations with an expected relatively high latency.

16 Claims, 12 Drawing Sheets

(51) Int. Cl.
G06F 12/08 (2016.01)
G06F 12/02 (2006.01)

(52) U.S. Cl.
CPC ............ G06F 3/0655 (2013.01); G06F 3/0656 (2013.01); G06F 3/0659 (2013.01); G06F 3/0683 (2013.01); G06F 3/0688 (2013.01); G06F 3/0689 (2013.01); G06F 12/0238 (2013.01); G06F 12/08 (2013.01); G06F 12/0802 (2013.01); G06F 12/0246 (2013.01); *G06F 2003/0697* (2013.01)

(56) References Cited

U.S. PATENT DOCUMENTS

| | | | |
|---|---|---|---|
| 6,292,856 B1 | 9/2001 | Marcotte | |
| 6,301,640 B2 | 10/2001 | Barve et al. | |
| 6,871,011 B1 | 3/2005 | Rahman et al. | |
| 7,127,545 B1 | 10/2006 | Nandi et al. | |
| 7,694,063 B1 | 4/2010 | Nandi et al. | |
| 7,877,380 B2 | 1/2011 | Agrawal et al. | |
| 7,926,059 B2 | 4/2011 | Viswanathan et al. | |
| 8,046,551 B1 | 10/2011 | Sahin | |
| 8,468,318 B2 | 6/2013 | Colgrove et al. | |
| 8,645,657 B2 | 2/2014 | Colgrove et al. | |
| 2004/0230742 A1 | 11/2004 | Ikeuchi et al. | |
| 2008/0059699 A1* | 3/2008 | Kubo et al. | 711/114 |
| 2009/0049256 A1* | 2/2009 | Hughes et al. | 711/158 |
| 2009/0083744 A1 | 3/2009 | Shimada | |
| 2010/0023712 A1 | 1/2010 | Yamaguchi et al. | |
| 2011/0258362 A1 | 10/2011 | McLaren et al. | |

\* cited by examiner

State Table 722

| Device Age 802 |
| Error Rate 804 |
| Total Errors 806 |
| Number of Recoverable Errors 808 |
| Number of Unrecoverable Errors 810 |
| Access Rate 812 |
| Data Age 814 |
| Cache Size 816 |
| Cache Flush Idle Time 818 |
| Allocation State of a First Allocation Space 820 |
| Allocation State of a Second Allocation Space 822 |
| Concurrency Level 824 |
| Expected Time(s) 826 |

FIG. 8

SCHEDULING OF I/O WRITES IN A STORAGE ENVIRONMENT

CROSS-REFERENCE TO RELATED APPLICATION

This application is a continuation application of and claims priority from U.S. patent application Ser. No. 14/160,169, filed on Jan. 21, 2014, now U.S. Pat. No. 9,037,827, which is a continuation of and claims priority from U.S. patent application Ser. No. 13/919,151, filed on Jun. 17, 2013, now U.S. Pat. No. 8,645,657, which is a continuation of and claims priority from U.S. patent application Ser. No. 12/882,877, filed on Sep. 15, 2010, now U.S. Pat. No. 8,468,318.

BACKGROUND OF THE INVENTION

1. Field of the Invention

This invention relates to computer networks and, more particularly, to computing data storage systems.

2. Description of the Related Art

As computer memory storage and data bandwidth increase, so does the amount and complexity of data that businesses manage. Large-scale distributed storage systems, such as data centers, typically run many business operations. A distributed storage system may be coupled to a number of client computers interconnected by one or more networks. If any portion of the distributed storage system has poor performance or becomes unavailable, company operations may be impaired or stopped completely. Such distributed storage systems seek to maintain high standards for data availability and high-performance functionality.

Within storage systems themselves, file system and storage device-level input/output (I/O) schedulers generally determine an order for read and write operations in addition to providing steps for how the operations are to be executed. For example, non-sequential read and write operations may be more expensive to execute for a storage device (e.g., in terms of time and/or resources) than sequential read and write operations. Therefore, I/O schedulers may attempt to reduce non-sequential operations. In addition, I/O schedulers may provide other functions such as starvation prevention, request merging, and inter-process fairness.

At least the read and write response times may substantially differ between storage devices. Such differences may be characteristic of the technology itself. Consequently, the technology and mechanisms associated with chosen data storage devices may determine the methods used to perform effective I/O scheduling. For example, many current algorithms were developed for systems utilizing hard disk drives (HDDs). HDDs comprise one or more rotating disks, each coated with a magnetic medium. These disks rotate at a rate of several thousand rotations per minute. In addition, an electro-magnetic actuator is responsible for positioning magnetic read/write devices over the rotating disks. The mechanical and electro-mechanical design of the device affects its I/O characteristics. Unfortunately, friction, wear, vibrations and mechanical misalignments may create reliability issues as well as affect the I/O characteristics of the HDD. Many current I/O schedulers are designed to take account for the input/output (I/O) characteristics of HDDs.

One example of another type of storage medium is a Solid-State Drive (SSD). In contrast to HDDs, SSDs utilize solid-state memory to store persistent data rather than magnetic media devices. The solid-state memory may comprise Flash memory cells. Flash memory has a number of features, which differ from that of hard drives. For example, Flash memory cells are generally erased in large blocks before being rewritten or reprogrammed. Flash memory is also generally organized in complex arrangements, such as dies, packages, planes and blocks. The size and parallelism of a chosen arrangement, the wear of the Flash memory over time, and the interconnect and transfer speeds of the device(s) all may vary. Additionally, such devices may also include a flash translation layer (FTL) to manage storage on the device. The algorithms utilized by the FTL can vary and may also contribute to variations in the behavior and/or performance of the device. Consequently, high performance and predictable latencies may not generally be achieved in systems using flash based SSDs for storage while utilizing I/O schedulers designed for systems such as hard drives which have different characteristics.

In view of the above, systems and methods for effectively scheduling read and write operations among a plurality of storage devices are desired.

SUMMARY OF THE INVENTION

Various embodiments of a computer system and methods for effectively scheduling read and write operations among a plurality of solid-state storage devices are disclosed.

In one embodiment, a computer system comprises a plurality of client computers configured to convey read and write requests over a network to one or more data storage arrays coupled to receive the read and write requests via the network. Contemplated is a data storage array(s) comprising a plurality of storage locations on a plurality of storage devices. In various embodiments, the storage devices are configured in a redundant array of independent drives (RAID) arrangement for data storage and protection. The data storage devices may include solid-state memory technology for data storage, such as Flash memory cells. Characteristics of corresponding storage devices are used to schedule I/O requests to the storage devices. Characteristics may include predicted response times for I/O requests, device age, any corresponding cache size, access rates, error rates, current I/O requests, completed I/O requests, and so forth.

In one embodiment, an I/O scheduler is configured to receive read and write requests and schedule the read and write requests for processing by a plurality of storage devices. The storage devices may exhibit varying latencies depending upon the operations being serviced, and may also exhibit unscheduled or unpredicted behaviors at various times that cause performance to vary from the expected or desired. In various embodiments these behaviors correspond to behaviors in which the devices are functioning properly (i.e., not in an error state), but are simply performing at a less than expected or desired level based on latencies and/or throughput. Such behaviors and performance may be referred to as "variable performance" behaviors. These variable performance behaviors may, for example, be exhibited by technologies such as flash based memory technologies. Contemplated is a storage controller that is configured to receive requests targeted to the data storage medium, said requests including a first type of operation and a second type of operation. The controller is further configured to schedule requests of the first type for immediate processing by said plurality of storage devices, and queue requests of the second type for later processing by the plurality of storage devices. Operations of the first type may correspond to operations with an expected relatively low latency, and operations of the second type may correspond to operations with an expected relatively high latency. Low latency operation may correspond to read operations and high latency operations may include write operations. Also contemplated are embodiments wherein subsequent to queuing a plurality of requests corresponding to the second type of operation, the storage controller is configured to cease processing requests corresponding to the first type of operation and process only those requests corresponding to the second type of operation.

These and other embodiments will become apparent upon consideration of the following description and accompanying drawings.

BRIEF DESCRIPTION OF THE DRAWINGS

FIG. 8 is a generalized block diagram illustrating another embodiment of a state table.

Figure 1:
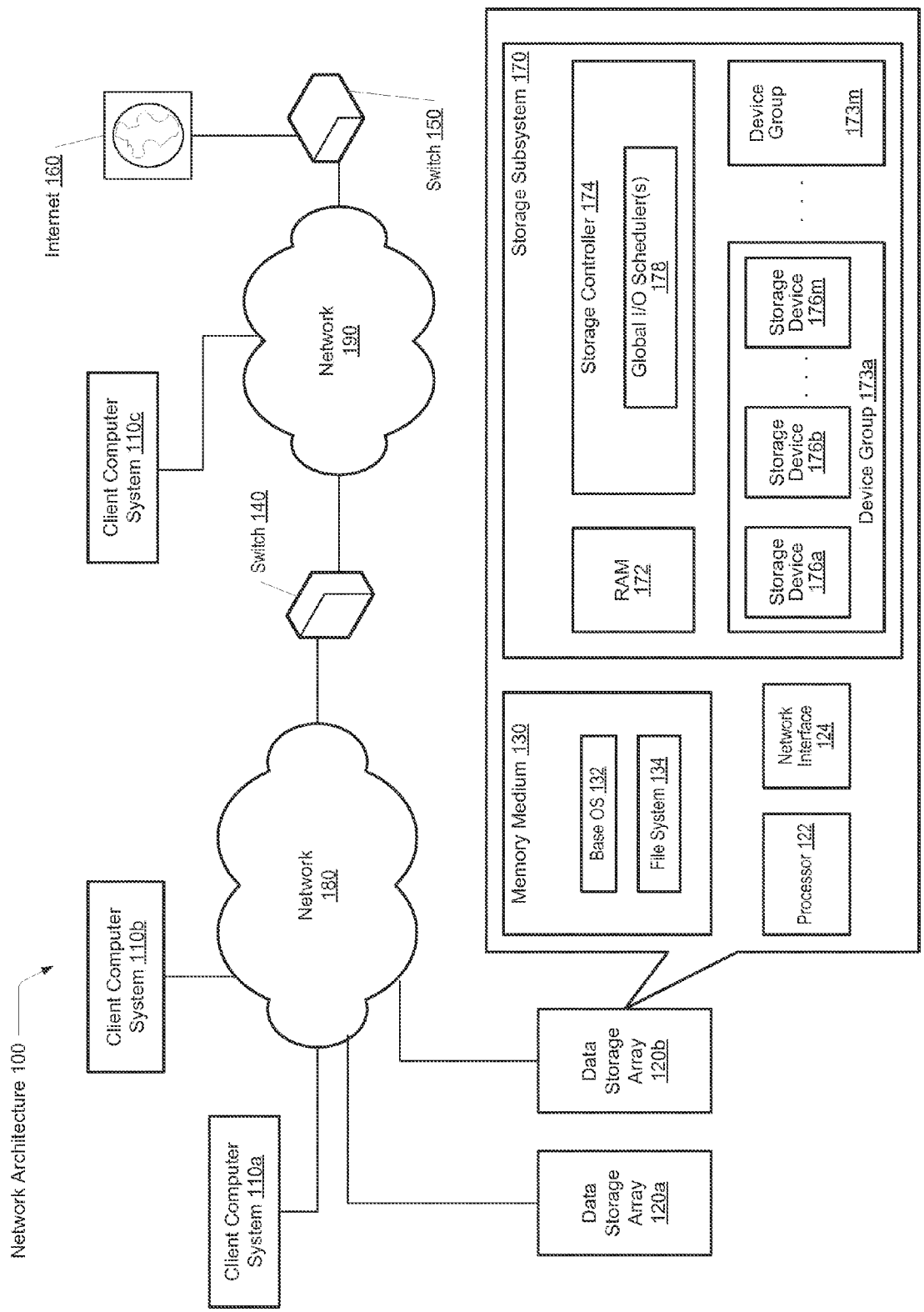
FIG. 1 is a generalized block diagram illustrating one embodiment of network architecture.

While the invention is susceptible to various modifications and alternative forms, specific embodiments are shown by way of example in the drawings and are herein described in detail. It is to be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art will recognize that the invention might be practiced without these specific details.

In some instances, well-known circuits, structures, signals, computer program instruction, and techniques have not been shown in detail to avoid obscuring the present invention.

Referring to FIG. 1, a generalized block diagram of one embodiment of a network architecture 100 is shown. As described further below, one embodiment of network architecture 100 includes client computer systems 110a-110b interconnected to one another through a network 180 and to data storage arrays 120a-120b. Network 180 may be coupled to a second network 190 through a switch 140. Client computer system 110c is coupled to client computer systems 110a-110b and data storage arrays 120a-120b via network 190. In addition, network 190 may be coupled to the Internet 160 or other outside network through switch 150.

It is noted that in alternative embodiments, the number and type of client computers and servers, switches, networks, data storage arrays, and data storage devices is not limited to those shown in FIG. 1. At various times one or more clients may operate offline. In addition, during operation, individual client computer connection types may change as users connect, disconnect, and reconnect to network architecture 100. Further, while the present description generally discusses network attached storage, the systems and methods described herein may also be applied to directly attached storage systems and may include a host operating system configured to perform one or more aspects of the described methods. Numerous such alternatives are possible and are contemplated. A further description of each of the components shown in FIG. 1 is provided shortly. First, an overview of some of the features provided by the data storage arrays 120a-120b is described.

In the network architecture 100, each of the data storage arrays 120a-120b may be used for the sharing of data among different servers and computers, such as client computer systems 110a-110c. In addition, the data storage arrays 120a-120b may be used for disk mirroring, backup and restore, archival and retrieval of archived data, and data migration from one storage device to another. In an alternate embodiment, one or more client computer systems 110a-110c may be linked to one another through fast local area networks (LANs) in order to form a cluster. Such clients may share a storage resource, such as a cluster shared volume residing within one of data storage arrays 120a-120b.

Each of the data storage arrays 120a-120b includes a storage subsystem 170 for data storage. Storage subsystem 170 may comprise a plurality of storage devices 176a-176m. These storage devices 176a-176m may provide data storage services to client computer systems 110a-110c. Each of the storage devices 176a-176m uses a particular technology and mechanism for performing data storage. The type of technology and mechanism used within each of the storage devices 176a-176m may at least in part be used to determine the algorithms used for controlling and scheduling read and write operations to and from each of the storage devices 176a-176m. The logic used in these algorithms may be included in one or more of a base operating system (OS) 116, a file system 140, one or more global I/O schedulers 178 within a storage subsystem controller 174, control logic within each of the storage devices 176a-176m, or otherwise. Additionally, the logic, algorithms, and control mechanisms described herein may comprise hardware and/or software.

Each of the storage devices 176a-176m may be configured to receive read and write requests and comprise a plurality of data storage locations, each data storage location being addressable as rows and columns in an array. In one embodiment, the data storage locations within the storage devices 176a-176m may be arranged into logical, redundant storage containers or RAID arrays (redundant arrays of inexpensive/independent disks). In some embodiments, each of the storage devices 176a-176m may utilize technology for data storage that is different from a conventional hard disk drive (HDD). For example, one or more of the storage devices 176a-176m may include or be further coupled to storage consisting of solid-state memory to store persistent data. In other embodiments, one or more of the storage devices 176a-176m may include or be further coupled to storage using other technologies such as spin torque transfer technique, magnetoresistive random access memory (MRAM) technique, shingled disks, memristors, phase change memory, or other storage technologies. These different storage techniques and technologies may lead to differing I/O characteristics between storage devices.

In one embodiment, the included solid-state memory comprises solid-state drive (SSD) technology. Typically, SSD technology utilizes Flash memory cells. As is well known in the art, a Flash memory cell holds a binary value based on a range of electrons trapped and stored in a floating gate. A fully erased Flash memory cell stores no or a minimal number of electrons in the floating gate. A particular binary value, such as binary 1 for single-level cell (SLC) Flash, is associated with an erased Flash memory cell. A multi-level cell (MLC) Flash has a binary value 11 associated with an erased Flash memory cell. After applying a voltage higher than a given threshold voltage to a controlling gate within a Flash memory cell, the Flash memory cell traps a given range of electrons in the floating gate. Accordingly, another particular binary value, such as binary 0 for SLC Flash, is associated with the programmed (written) Flash memory cell. A MLC Flash cell may have one of multiple binary values associated with the programmed memory cell depending on the voltage applied to the control gate.

The differences in technology and mechanisms between HDD technology and SDD technology may lead to differences in input/output (I/O) characteristics of the data storage devices 176a-176m. Generally speaking, SSD technologies provide lower read access latency times than HDD technologies. However, the write performance of SSDs is generally slower than the read performance and may be significantly impacted by the availability of free, programmable blocks within the SSD. As the write performance of SSDs is significantly slower compared to the read performance of SSDs, problems may occur with certain functions or operations expecting latencies similar to reads. Additionally, scheduling may be made more difficult by long write latencies that affect read latencies. Accordingly, different algorithms may be used for I/O scheduling in each of the data storage arrays 120a-120b.

In one embodiment, where different types of operations such as read and write operations have different latencies, algorithms for I/O scheduling may segregate these operations and handle them separately for purposes of scheduling. For example, within one or more of the storage devices 176a-176m, write operations may be batched by the devices themselves, such as by storing them in an internal cache. When these caches reach a given occupancy threshold, or at some other time, the corresponding storage devices 176a-176m may flush the cache. In general, these cache flushes may introduce added latencies to read and/or writes at unpredictable times, which leads to difficulty in effectively scheduling operations. Therefore, an I/O scheduler may utilize characteristics of a storage device, such as the size of the cache or a measured idle time, in order to predict when such a cache flush may occur. Knowing characteristics of each of the one or more storage devices 176a-176m may lead to more effective I/O scheduling. In one embodiment, the global I/O scheduler 178 may detect a given device of the one or more of the storage devices 176a-176m is exhibiting long response times for I/O requests at unpredicted times. In response, the global I/O scheduler 178 may schedule a given operation to the given device in order to cause the device to resume exhibiting expected behaviors. In one embodiment, such an operation may be a cache flush command, a trim command, an erase command, or otherwise. Further details concerning I/O scheduling will be discussed below.

Components of a Network Architecture

Again, as shown, network architecture 100 includes client computer systems 110a-110c interconnected through networks 180 and 190 to one another and to data storage arrays 120a-120b. Networks 180 and 190 may include a variety of techniques including wireless connection, direct local area network (LAN) connections, wide area network (WAN) connections such as the Internet, a router, storage area network, Ethernet, and others. Networks 180 and 190 may comprise one or more LANs that may also be wireless. Networks 180 and 190 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in networks 180 and 190. Switch 140 may utilize a protocol associated with both networks 180 and 190. The network 190 may interface with a set of communications protocols used for the Internet 160 such as the Transmission Control Protocol (TCP) and the Internet Protocol (IP), or TCP/IP. Switch 150 may be a TCP/IP switch.

Client computer systems 110a-110c are representative of any number of stationary or mobile computers such as desktop personal computers (PCs), servers, server farms, workstations, laptops, handheld computers, servers, personal digital assistants (PDAs), smart phones, and so forth. Generally speaking, client computer systems 110a-110c include one or more processors comprising one or more processor cores. Each processor core includes circuitry for executing instructions according to a predefined general-purpose instruction set. For example, the x86 instruction set architecture may be selected. Alternatively, the Alpha®, PowerPC®, SPARC®, or any other general-purpose instruction set architecture may be selected. The processor cores may access cache memory subsystems for data and computer program instructions. The cache subsystems may be coupled to a memory hierarchy comprising random access memory (RAM) and a storage device.

Each processor core and memory hierarchy within a client computer system may be connected to a network interface. In addition to hardware components, each of the client computer systems 110a-110c may include a base operating system (OS) stored within the memory hierarchy. The base OS may be representative of any of a variety of operating systems, such as, for example, MS-DOS®, MS-WINDOWS®, OS/2®, UNIX®, Linux®, Solaris®, AIX®, DART, or otherwise. As such, the base OS may be operable to provide various services to the end-user and provide a software framework operable to support the execution of various programs. Additionally, each of the client computer systems 110a-110c may include a hypervisor used to support virtual machines (VMs). As is well known to those skilled in the art, virtualization may be used in desktops and servers to fully or partially decouple software, such as an OS, from a system's hardware. Virtualization may provide an end-user with an illusion of multiple OSes running on a same machine each having its own resources and access to logical storage entities (e.g., LUNs) built upon the storage devices 176a-176m within each of the data storage arrays 120a-120b.

Each of the data storage arrays 120a-120b may be used for the sharing of data among different servers, such as the client computer systems 110a-110c. Each of the data storage arrays 120a-120b includes a storage subsystem 170 for data storage. Storage subsystem 170 may comprise a plurality of storage devices 176a-176m. Each of these storage devices 176a-176m may be an SSD. A controller 174 may comprise logic for handling received read/write requests. For example, the algorithms briefly described above may be executed in at least controller 174. A random-access memory (RAM) 172 may be used to batch operations, such as received write requests. In various embodiments, when batching write operations (or other operations) non-volatile storage (e.g., NVRAM) may be used.

The base OS 132, the file system 134, any OS drivers (not shown) and other software stored in memory medium 130 may provide functionality providing access to files and the management of these functionalities. The base OS 134 and the OS drivers may comprise program instructions stored on the memory medium 130 and executable by processor 122 to perform one or more memory access operations in storage subsystem 170 that correspond to received requests. The system shown in FIG. 1 may generally include one or more file servers and/or block servers.

Each of the data storage arrays 120a-120b may use a network interface 124 to connect to network 180. Similar to client computer systems 110a-110c, in one embodiment, the functionality of network interface 124 may be included on a network adapter card. The functionality of network interface 124 may be implemented using both hardware and software. Both a random-access memory (RAM) and a read-only memory (ROM) may be included on a network card implementation of network interface 124. One or more application specific integrated circuits (ASICs) may be used to provide the functionality of network interface 124.

In one embodiment, a data storage model may be developed which seeks to optimize I/O performance. In one embodiment, the model is based at least in part on characteristics of the storage devices within a storage system. For example, in a storage system which utilizes solid state storage technologies, characteristics of the particular devices may be used to develop models for the devices, which may in turn serve to inform corresponding I/O scheduling algorithms. For example, if particular storage devices being used exhibit write latencies that are relatively high compared to read latencies, such a characteristic may be accounted for in scheduling operations. It is noted that what is considered relatively high or low may vary depending upon the given system, the types of data being processed, the amount of data processed, the timing of data, or otherwise. Generally speaking, the system is programmable to determine what constitutes a low or high latency, and/or what constitutes a significant difference between the two.

Generally speaking, any model which is developed for devices, or a computing system, will be incomplete. Often, there are simply too many variables to account for in a real world system to completely model a given system. In some cases, it may be possible to develop models which are not complete but which are nevertheless valuable. As discussed more fully below, embodiments are described wherein storage devices are modeled based upon characteristics of the devices. In various embodiments, I/O scheduling is performed based on certain predictions as to how the devices may behave. Based upon an understanding of the characteristics of the devices, certain device behaviors are more predictable than others. In order to more effectively schedule operations for optimal I/O performance, greater control over the behavior of the system is desired. Device behaviors which are unexpected, or unpredictable, make it more difficult to schedule operations. Therefore, algorithms are developed which seek to minimize unpredictable or unexpected behavior in the system.

Figure 2:
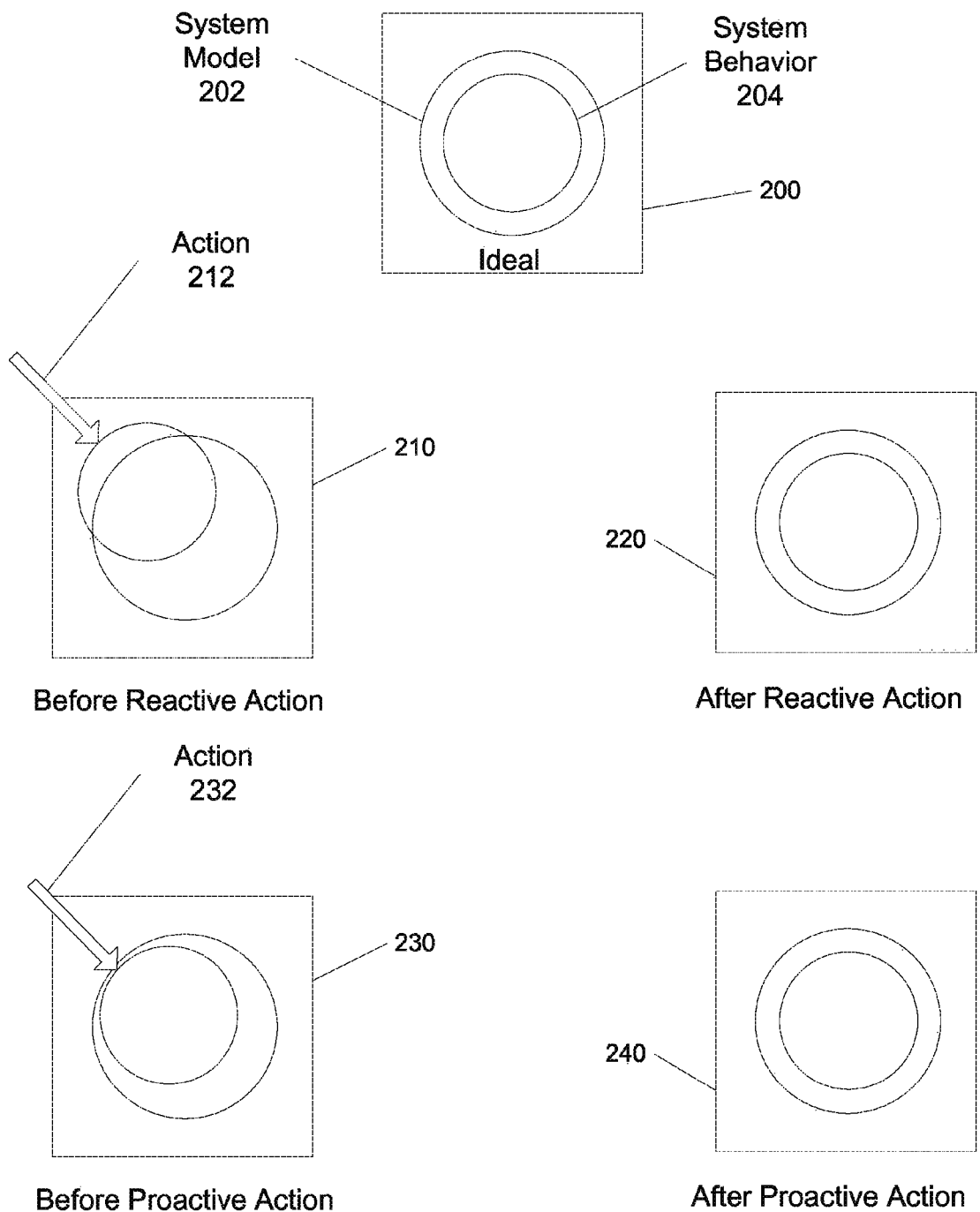
FIG. 2 depicts a conceptual model according to one embodiment of a computing system.

FIG. 2 provides a conceptual illustration of a device or system that is being modeled, and approaches used to minimize unpredictable behaviors within the device or system. In a first block 200, an Ideal scenario is depicted. Shown in block 200 is a system 204 and a model 202 of that system. In one embodiment, the system may be that of a single device. Alternatively, the system may comprises many devices and/or components. As discussed above, the model 202 may not be a complete model of the system 204 it seeks to model. Nevertheless, the model 202 captures behaviors of interest for purposes of the model. In one embodiment, the model 202 may seek to model a computing storage system. In the ideal scenario 200, the actual behavior of the system 204 is "aligned" with that of the model 202. In other words, the behavior of the system 204 generally comports with those behaviors the model 202 seeks to capture. While the system behavior 204 is in accord with that of the model 202, the system behavior may generally be more predictable. Consequently, scheduling of operations (e.g., read and write operations) within the system may be performed more effectively.

For example, if it is desired to optimize read response times, it may be possible to schedule reads so that they are serviced in a more timely manner if other behaviors of the system are relatively predictable. On the other hand, if system behavior is relatively unpredictable, then a level of confidence in an ability to schedule those reads to provide results when desired is diminished. Block 210 illustrates a scenario in which system behavior (the smaller circle) is not aligned with that of the model of that system (the larger circle). In this case, the system is exhibiting behaviors which fall outside of the model. Consequently, system behavior is less predictable and scheduling of operations may become less effective. For example, if solid state memory devices are used in the storage system, and these devices may initiate actions on their own which cause the devices to service requests with greater (or otherwise unexpected) latencies, then any operations which were scheduled for that device may also experience greater or unexpected latencies. One example of such a device operation is an internal cache flush.

In order to address the problem of unexpected or unscheduled system behaviors and corresponding variable performance, the model which is developed may include actions which it may take to restore the system to a less uncertain state. In other words, should the system begin exhibiting behaviors which degrade the model's ability to predict the system's behavior, the model has built into it certain actions it can take to restore the system to a state wherein the particular unexpected behavior is eliminated or rendered less likely. In the example shown, an action 212 is shown which seeks to "move" the system to a state more closely aligned with the model. The action 212 may be termed a "reactive" action or operation as it is performed in response to detecting the system behavior which is outside of the model. Subsequent to performing the action 212, a more ideal state 220 may be achieved.

While developing a model which can react to unpredictable behaviors to move the system to a more ideal state is desirable, the existence of those unpredictable behaviors may still interfere with effective scheduling operations. Therefore, it would be desirable to minimize the occurrence of the unexpected behaviors or events. In one embodiment, a model is developed which includes actions or operations designed to prevent or reduce the occurrence of unexpected behaviors. These actions may be termed "proactive" actions or operations as they may generally be performed proactively in order to prevent the occurrence of some behavior or event, or change the timing of some behavior or event. Block 230 in FIG. 2 illustrates a scenario in which system behavior (the smaller circle) is within that of the model (the larger circle). Nevertheless, the model takes action 232 to move the system behavior in such a way that it remains within the model and perhaps more ideally aligned. The system behavior in block 230 may be seen to be nearing a state where it exhibits behavior outside of the model. In such a case the model may have some basis for believing the system is nearing such a state. For example, if the I/O scheduler has conveyed a number of write operations to a given device, the scheduler may anticipate that the device may perform an internal cache flush operation at some time in the future. Rather than waiting for the occurrence of such an event, the scheduler may proactively schedule a cache flush operation for that device so that the cache flush is performed at a time of the scheduler's choosing. Alternatively, or in addition to the above, such proactive operations could be performed at random times. While the cache flush still occurs, its occurrence is not unexpected and it has now become part of the overall scheduling performed by the scheduler and may be managed in a more effective and intelligent manner. Subsequent to performing this proactive action 232, the system may generally be seen to be in a more predictable state 240. This is because a cache flush was scheduled and performed on the device and the likelihood of the device spontaneously initiating an internal cache flush on its own is reduced (i.e., its cache has already been flushed). By combining both reactive and proactive actions or operations within the model, greater system predictability may be achieved and improved scheduling may likewise be achieved.

Figure 3:
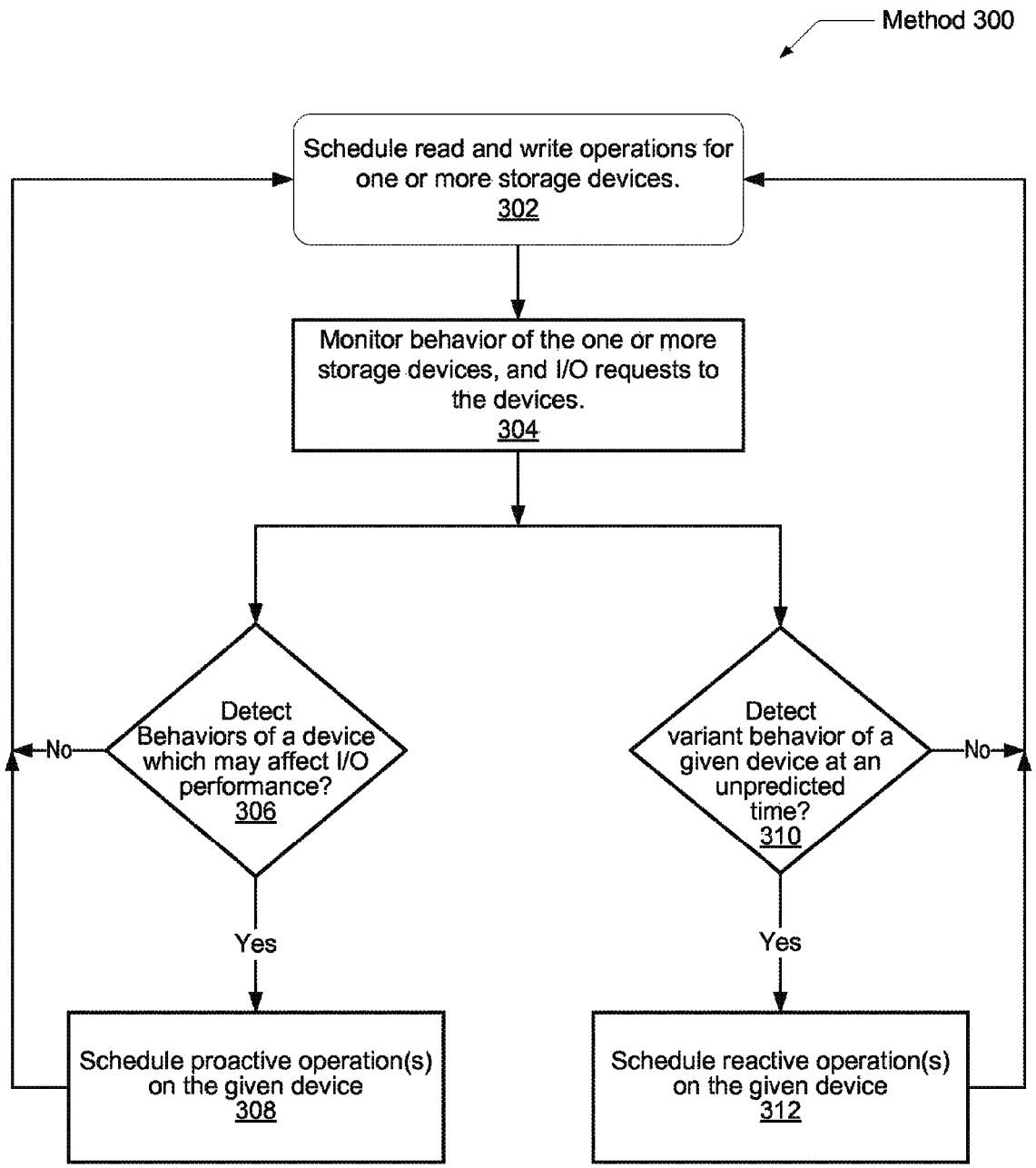
FIG. 3 is a generalized flow diagram illustrating one embodiment of a method for adjusting I/O scheduling to reduce unpredicted variable I/O response times on a data storage subsystem.

Referring now to FIG. 3, one embodiment of a method 300 for performing I/O scheduling to reduce unpredicted behaviors is shown. The components embodied in network architecture 100 and data storage arrays 120*a*-120*b* described above may generally operate in accordance with method 300. The steps in this embodiment are shown in sequential order. However, some steps may occur in a different order than shown, some steps may be performed concurrently, some steps may be combined with other steps, and some steps may be absent in another embodiment.

In block 302, an I/O scheduler schedules read and write operations for one or more storage devices. In various embodiments, the I/O scheduler may maintain a separate queue (either physically or logically) for each storage device. In addition, the I/O scheduler may include a separate queue for each operation type supported by a corresponding storage device. For example, an I/O scheduler may maintain at least a separate read queue and a separate write queue for an SSD. In block 304, the I/O scheduler may monitor the behavior of the one or more storage devices. In one embodiment, the I/O scheduler may include a model of a corresponding storage device (e.g., a behavioral type model and/or algorithms based at least in part on a model of the device) and receive state data from the storage device to input to the model. The model within the I/O scheduler may both model and predict behavior of the storage device by utilizing known and/or observed characteristics of the storage device.

The I/O scheduler may detect characteristics of a given storage device which affect, or may affect, I/O performance. For example, as will be discussed further below, various characteristics and states of devices, and of I/O traffic, may be maintained. By observing these characteristics and states, the I/O scheduler may predict that a given device may soon enter a state wherein it exhibits high I/O latency behavior. For example, in one embodiment, the I/O scheduler may detect or predict that an internal cache flush is about to occur within a storage device which may affect the response times of requests to the storage device. For example, in one embodiment, a storage device that sits idle for a given amount of time may flush its internal cache. In some embodiments, whether a given device is idle may be based on a perspective external to the device. For example, if an operation has not been scheduled for a device for a period of time, the device may be deemed to be idle for approximately that period of time. In such an embodiment, the device could in fact be busy based on internally initiated activity within the device. However, such internally initiated activity would not be considered in determining whether the device is idle. In other embodiments, internally initiated activities of a device could be considered when determining whether a device is idle or busy. By observing the behavior of the device, and noting it has been idle for a given amount of time, the scheduler may predict when an internal cache flush might occur. In other embodiments, the scheduler may also have the ability to poll devices to determine various states or conditions of the devices. In any event, the scheduler may be configured to determine the potential for unscheduled behaviors such as internal cache flushes and initiate a proactive operation in order to prevent the behavior from occurring. In this manner, the scheduler controls the timing of events in the device, and the system, and is better able to schedule operations.

Various characteristics may be used to as a basis for making predictions regarding device behavior. In various embodiments, the scheduler may maintain a status of currently pending operations and/or a history of recent operations corresponding to the storage devices. In some embodiments, the I/O scheduler may know the size of a cache within a device and/or the caching policies and maintain a count of a number of write requests sent to the storage device. In other embodiments, other mechanisms may be available for determining the state of a cache within a device (e.g., direct polling type access to the device). In addition, the I/O scheduler may track the amount of data in write requests sent to the storage device. The I/O scheduler may then detect when either a number of write requests or a total amount of data corresponding to the write requests reaches a given threshold. If the I/O scheduler detects such a condition (conditional block 306), then in block 308, the I/O scheduler may schedule a particular operation for the device. Such an operation may generally correspond to the above described proactive operations. For example, the I/O scheduler may place a cache flush command in a corresponding queue to force the storage device to perform a cache flush at a time of the scheduler's choosing. Alternatively, the I/O scheduler may place a dummy read operation in the queue in order to determine whether or not any cache flush on the storage device has completed. Still further, the scheduler could query a device to obtain status information (e.g., idle, busy, etc.). These and other characteristics and operations are possible and are contemplated. In addition, in various embodiments proactive operations may be scheduled when reconditioning an SSD in place. In such an embodiment, the SSD firmware and/or mapping tables may get into a state where requests hang or are permanently slow. It may be possible to just reset the drive or power the drive off and on to unclog the firmware. However if the condition is permanent (i.e. a bug in the firmware that can't handle the current state of the mapping tables) another way to fix it is to reformat the drive to completely clean and reset the FTL and then repopulate it or reuse it for something other data.

The actions described above may be performed to prevent or reduce a number of occurrences of unpredicted variable response times. Simultaneously, the I/O scheduler may detect the occurrence of any variable behavior of a given storage device at an unpredicted time. If the I/O scheduler detects such a condition (conditional block 310), then in block 312, the I/O scheduler may place an operation in a corresponding queue of the storage device. In this case, the operation may generally correspond to the above described reactive operations. The operation may be used both to reduce the amount of time the storage device provides variable behavior and to detect the end of the variant behavior. In various embodiments, proactive and/or reactive operations may generally include any operation capable of placing a device into (at least in part) a known state. For example, initiating a cache flush operation may result in the device achieving an empty cache state. A device with a cache that is empty may be less likely to initiate an internal cache flush than a device whose cache is not empty. Some examples of proactive and/or reactive operations include cache flush operations, erase operations, secure erase operations, trim operations, sleep operations, hibernate operations, powering on and off, and reset operations.

Figure 4:
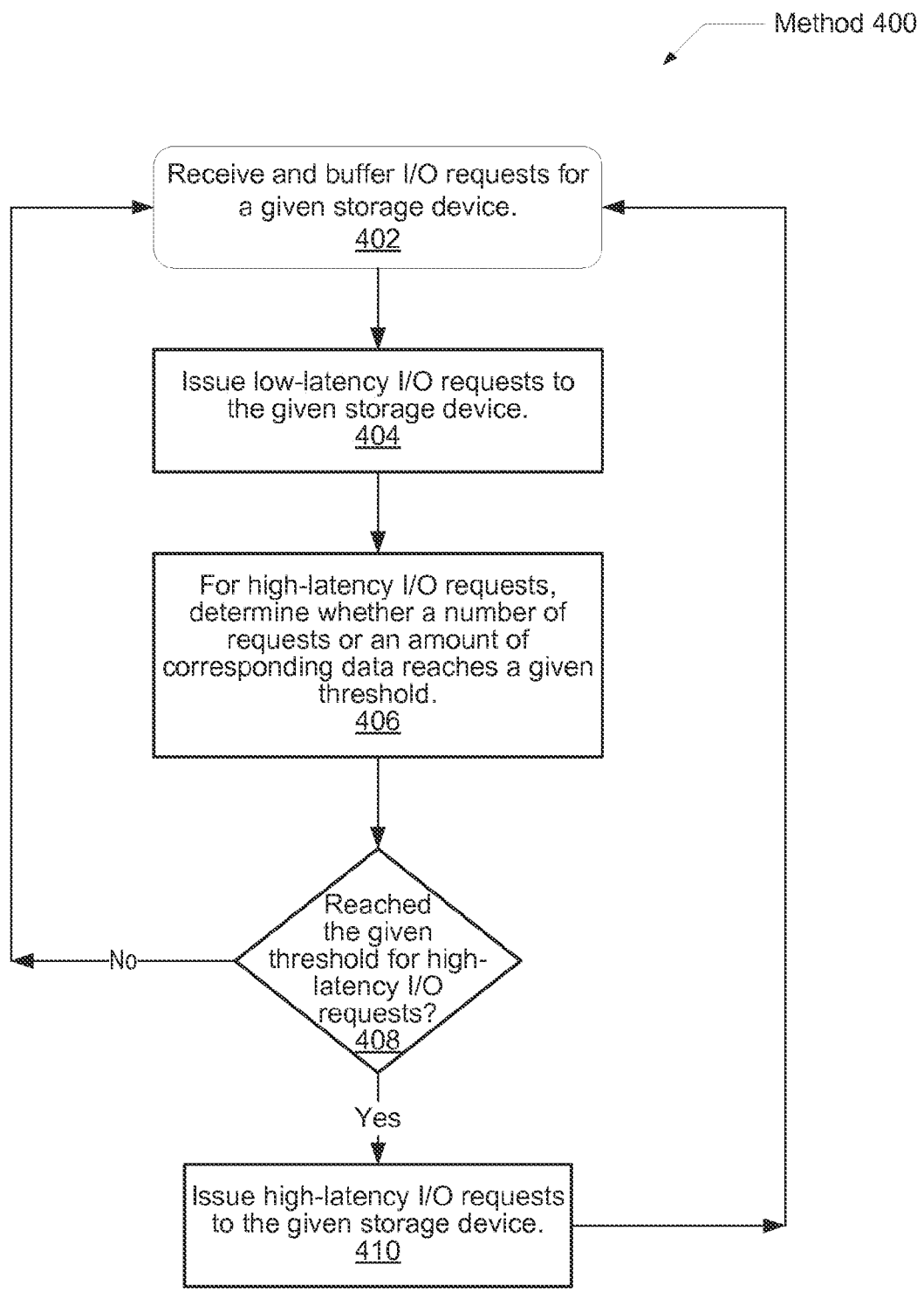
FIG. 4 is generalized block diagram illustrating one embodiment of a method for segregating operations issued to a storage device.

Referring now to FIG. 4, one embodiment of a method 400 for segregating operations issued to a storage device is shown. The steps in this embodiment are shown in sequential order. However, some steps may occur in a different order than shown, some steps may be performed concurrently, some steps may be combined with other steps, and some steps may be absent in another embodiment. In various embodiments, operations of a first type may be segregated from operations of a second type for scheduling purposes. For example, in one embodiment operations of a first type may be given scheduling priority over operations of a second type. In such an embodiment, operations of the first type may be scheduled for processing relatively quickly, while operations of the second type are queued for later processing (in effect postponing the processing of the operations). At a given point in time, processing of operations of the first type may be halted while the previously queued operations (of the second type) are processed. Subsequently, processing of the second operation type may again be stopped while processing priority is returned to operations of the first type. When processing is halted for one type and begins for another type may be based upon periods of time, accumulated data, transaction frequency, available resources (e.g., queue utilization), any combination of the above, or based upon any desired condition as desired.

For random read and write requests, an SSD typically demonstrates better performance than a HDD. However, an SSD typically exhibits worse performance for random write requests than read requests due to the characteristics of an SSD. Unlike an HDD, the relative latencies of read and write requests are quite different, with write requests typically taking significantly longer than read requests because it takes longer to program a Flash memory cell than read it. In addition, the latency of write operations can be quite variable due to additional operations that need to be performed as part of the write. For example, an erase operation may be performed prior to a write or program operation for a Flash memory cell, which is already modified. Additionally, an erase operation may be performed on a block-wise basis. In such a case, all of the Flash memory cells within a block (an erase segment) are erased together. Because a block is relatively large and comprises multiple pages, the operation may take a relatively long time. Alternatively, the FTL may remap a block into an already erased erase block. In either case, the additional operations associated with performing a write operation may cause writes to have a significantly higher variability in latency as well as a significantly higher latency than reads.

Other storage device types may exhibit different characteristics based on request type. In addition to the above, certain storage devices may offer poor and/or variable performance if read and write requests are mixed. Therefore, in order to improve performance, various embodiments may segregate read and write requests. It is noted that while the discussion generally speaks of read and write operations in particular, the systems and methods described herein may be applied to other operations as well. In such other embodiments, other relatively high and low latency operations may be identified as such and segregated for scheduling purposes. Additionally, in some embodiments reads and writes may be categorized as a first type of operation, while other operations such as cache flushes and trim operations may be categorized as corresponding to a second type of operation. Various combinations are possible and are contemplated.

In block 402, an I/O scheduler may receive and buffer I/O requests for a given storage device of one or more storage devices. In block 404, low-latency I/O requests may generally be issued to the storage device in preference to high latency requests. For example, depending on the storage technology used by the storage devices, read requests may have lower latencies than write requests and other command types and may issue first. Consequently, write requests may be accumulated while read requests are given issue priority (i.e., are conveyed to the device ahead of write requests). At some point in time, the I/O scheduler may stop issuing read requests to the device and begin issuing write requests. In one embodiment, the write requests may be issued as a stream of multiple writes. Therefore, the overhead associated with a write request may be amortized over multiple write requests. In this manner, high latency requests (e.g., write requests) and low latency requests (e.g., read requests) may be segregated and handled separately.

In block 406, the I/O scheduler may determine whether a particular condition exists which indicates high latency requests should be conveyed to a device(s). For example, in one embodiment detecting such a condition may comprise detecting a given number of high latency I/O requests, or an amount of corresponding data, has accumulated and reached a given threshold. Alternatively, a rate of high latency requests being received may reach some threshold. Numerous such conditions are possible and are contemplated. In one embodiment, the high-latency requests may be write requests. If such a condition occurs (conditional block 408), then in block 410, the I/O scheduler may begin issuing high-latency I/O requests to the given storage device. The number of such requests issued may vary depending upon a given algorithm. The number could correspond to a fixed or programmable number of writes, or an amount of data. Alternatively, writes could be issued for a given period of time. For example, the period of time may last until a particular condition ceases to exist (e.g., a rate of received writes falls), or a particular condition occurs. Alternatively, combinations of any of the above may be used in determining when to begin and when to stop issuing high latency requests to the device(s). In some embodiments, the first read request after a stream of write requests may be relatively slow compared to other read requests. In order to avoid scheduling a "genuine" read requests in the issue slot immediately following a stream of write requests, the I/O scheduler may be configured to automatically schedule a "dummy" read following the stream of write requests. In this context a "genuine" read is a read for which data is requested by a user or application, and a "dummy" read is an artificially created read whose data may simply be discarded. In various embodiments, until the dummy read is detected as finished, the write requests may not be determined to have completed. Also, in various embodiments, a cache flush may follow a stream of writes and be used to determine when the writes have completed.

Figure 5:
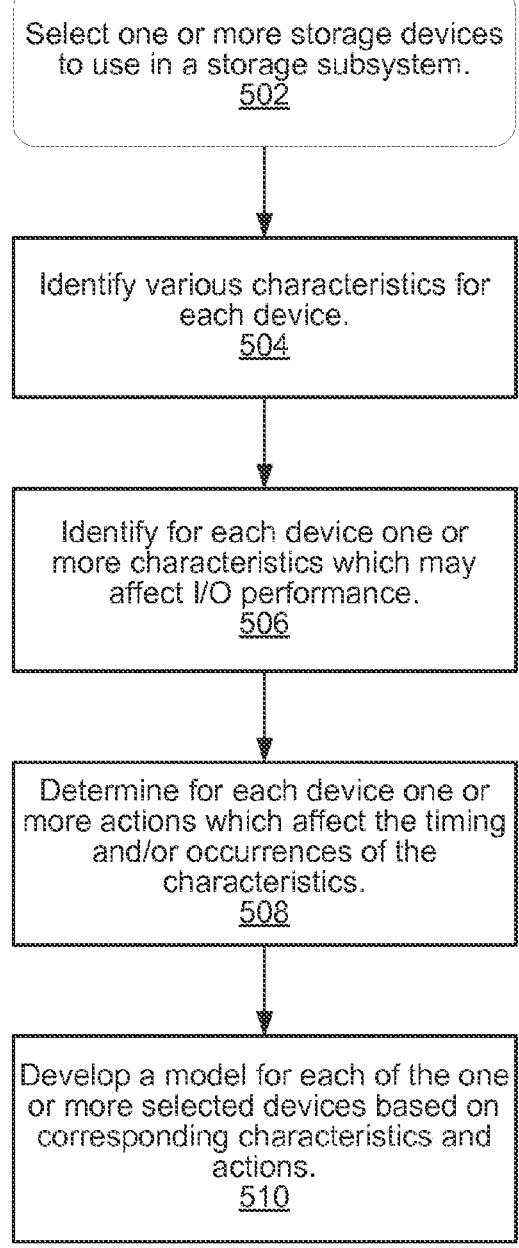
FIG. 5 is generalized flow diagram illustrating one embodiment of a method for developing a model to characterize the behavior of storage devices in a storage subsystem.

Referring now to FIG. 5, one embodiment of a method 500 for developing a model to characterize the behavior of storage devices in a storage subsystem is shown. The steps in this embodiment are shown in sequential order. However, some steps may occur in a different order than shown, some steps may be performed concurrently, some steps may be combined with other steps, and some steps may be absent in another embodiment.

In block 502, one or more storage devices may be selected to be used in a storage subsystem. In block 504, various characteristics for each device may be identified such as cache sizes, typical read and write response times, storage topology, an age of the device, and so forth. In block 506, one or more characteristics which affect I/O performance for a given storage device may be identified.

In block 508, one or more actions which affect the timing and/or occurrences of the characteristics for a given device may be determined. Examples may include a cache flush and execution of given operations such as an erase operation for an SSD. For example, a force operation such as a cache flush may reduce the occurrence of variable response times of an SSD at unpredicted times. In block 510, a model may be developed for each of the one or more selected devices based on corresponding characteristics and actions. This model may be used in software, such as within an I/O scheduler within a storage controller.

Figure 6:
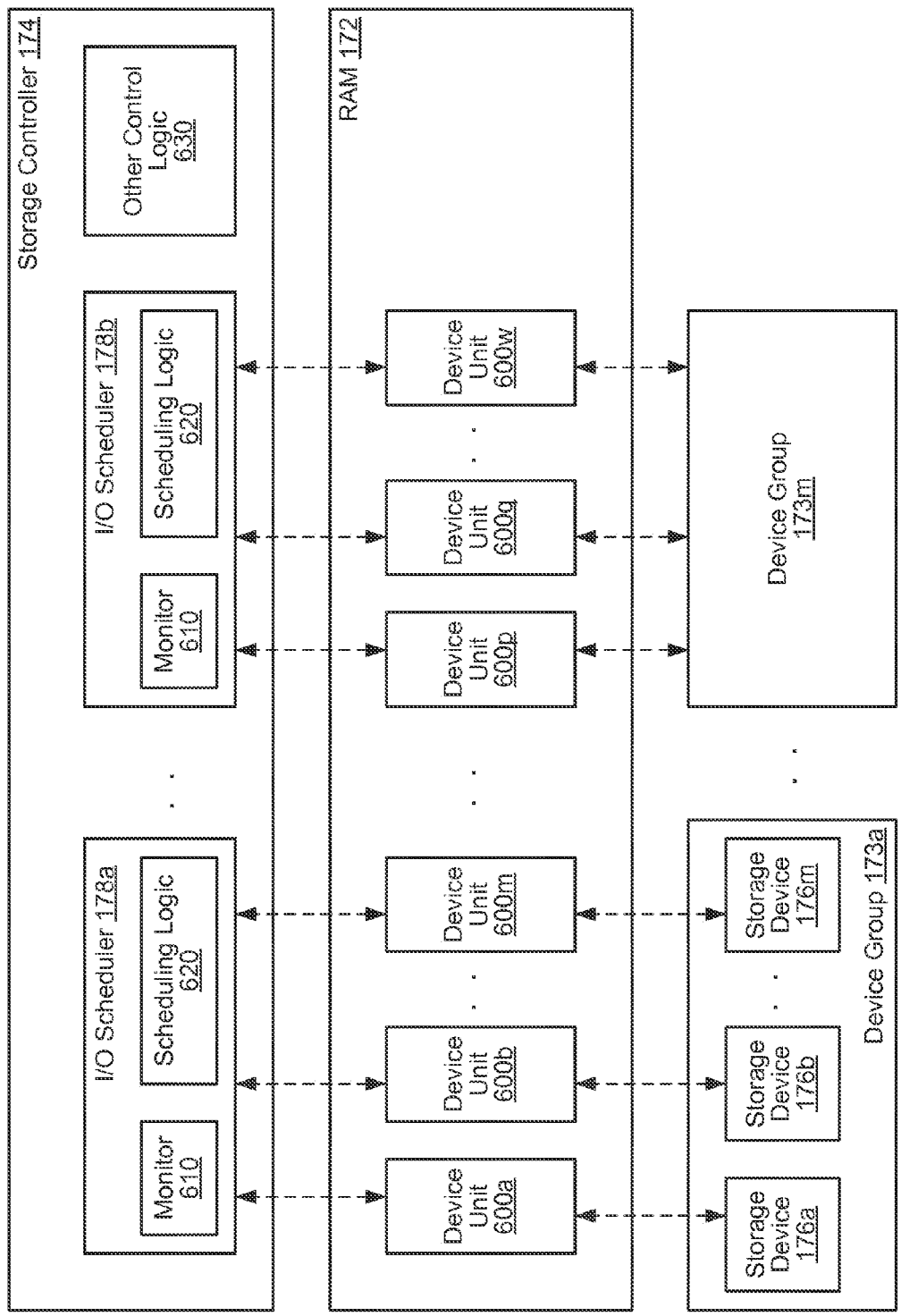
FIG. 6 is a generalized block diagram illustrating one embodiment of a storage subsystem.

Turning now to FIG. 6, a generalized block diagram of one embodiment of a storage subsystem is shown. In the embodiment shown, each of the storage devices 176a-176m are shown within a single device group. However, in other embodiments, one or more storage devices 176a-176m may be partitioned in two or more of the device groups 173a-173m. One or more corresponding operation queues and status tables for each storage device may be included in the device units 600a-600w. These device units may be stored in RAM 172. A corresponding I/O scheduler 178 may be included for each one of the device groups 173a-173m. Each I/O scheduler 178 may include a monitor 610 that tracks state data for each of the storage devices within a corresponding device group. Scheduling logic 620 may perform the decision of which requests to issue to a corresponding storage device and determine the timing for issuing requests.

Figure 7:
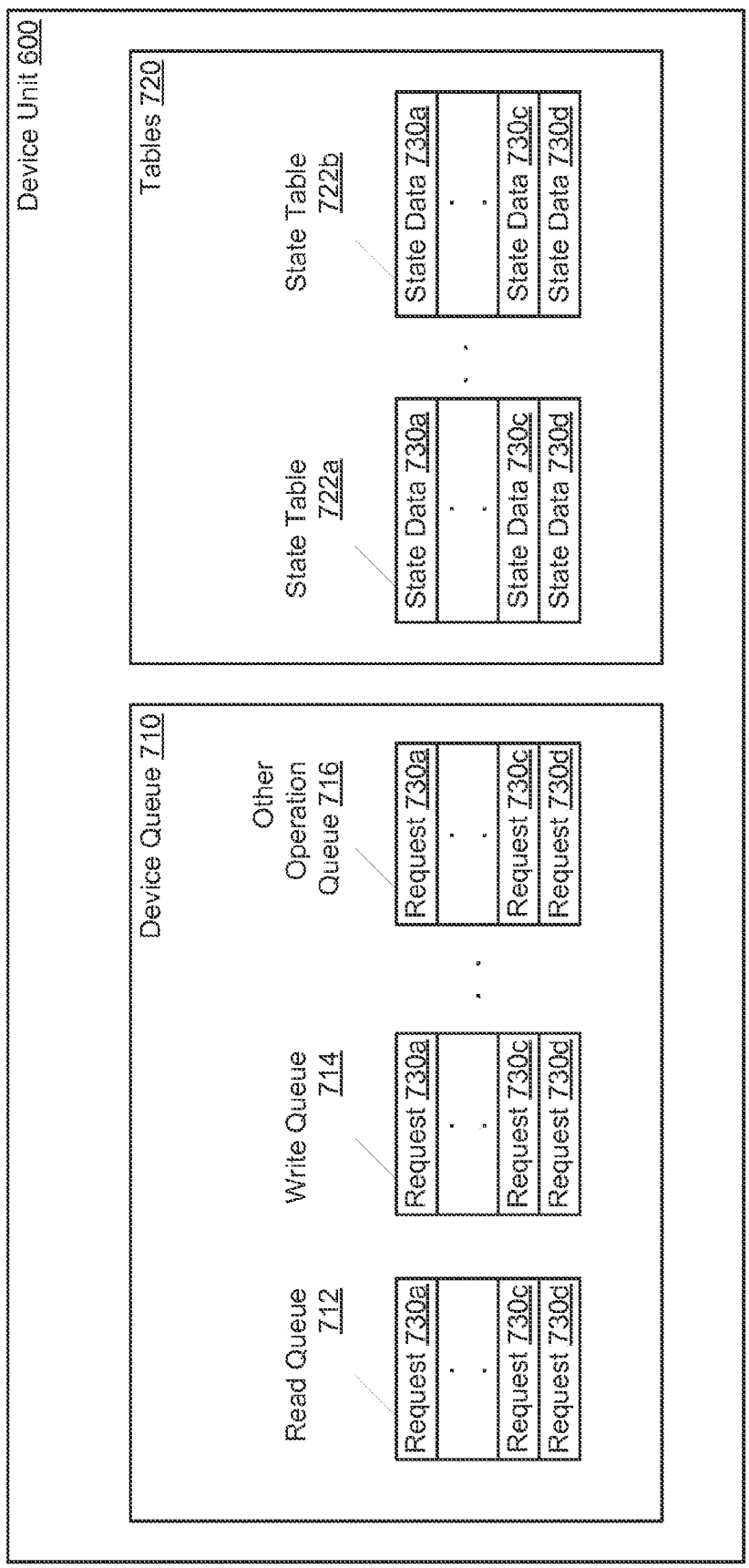
FIG. 7 is a generalized block diagram illustrating another embodiment of a device unit.

Turning now to FIG. 7, a generalized block diagram of one embodiment of a device unit 600 is shown. Device unit 600 may comprise a device queue 710 and tables 720. Device queue 710 may include a read queue 712, a write queue 714 and one or more other queues such as other operation queue 716. Each queue may comprise a plurality of entries 730 for storing one or more corresponding requests. For example, a device unit for a corresponding SSD may include queues to store at least read requests, write requests, trim requests, erase requests and so forth. Tables 720 may comprise one or more state tables 722a-722b, each comprising a plurality of entries 730 for storing state data. In various embodiments, the queues shown in FIG. 7 may be either physically and/or logically separate. It is also noted that while the queues and tables are shown to include a particular number of entries, the entries themselves do not necessarily correspond to one another. Additionally, the number of queues and tables may vary from that shown in the figure. In addition, entries within a given queue, or across queues, may be prioritized. For example, read requests may have a high, medium, or low priority which affects an order within which the request is issued to the device. In addition, such priorities may be changeable depending upon various conditions. For example, a low priority read that reaches a certain age may have its priority increased. Numerous such prioritization schemes and techniques are known to those skilled in the art. All such approaches are contemplated and may be used in association with the systems and methods described herein.

Referring now to FIG. 8, a generalized block diagram illustrating one embodiment of a state table such as that shown in FIG. 7 is shown. In one embodiment, such a table may include data corresponding to state, error, wear level information, and other information for a given storage device. A corresponding I/O scheduler may have access to this information, which may allow the I/O scheduler to better schedule I/O requests to the storage devices. In one embodiment, the information may include at least one or more of a device age 802, an error rate 804, a total number of errors detected on the device 806, a number of recoverable errors 808, a number of unrecoverable errors 810, an access rate of the device 812, an age of the data stored 814, a corresponding cache size 816, a corresponding cache flush idle time 818, one or more allocation states for allocation spaces 820-822, a concurrency level 824, and expected time(s) 826 for various operations. The allocation states may include filled, empty, error and so forth. The concurrency level of a given device may include information regarding the ability of the device to handle multiple operations concurrently. For example, if a device has 4 flash chips and each one is capable of doing one transfer at a time, then the device may be capable of up to 4 parallel operations. Whether or not particular operations may be performed in parallel may depend on how the data was laid out on the device. For example, if the data inside of the device is laid out where the data accessed by a request is all on one chip then operations on that data could proceed in parallel with requests accessing data on different chips. However, if the data accessed by a request is striped across multiple chips, then requests may interfere with one other. Consequently, a device may be capable of a maximum of N parallel/concurrent operations (e.g., 4 in the above described as where the device has 4 chips). Alternatively, the maximum level of concurrency may be based upon the types of operations involved. In any event, stored information indicative of a level of concurrency N, and a number of pending transactions M, may be taken into account by the scheduler when scheduling operations.

Figure 9:
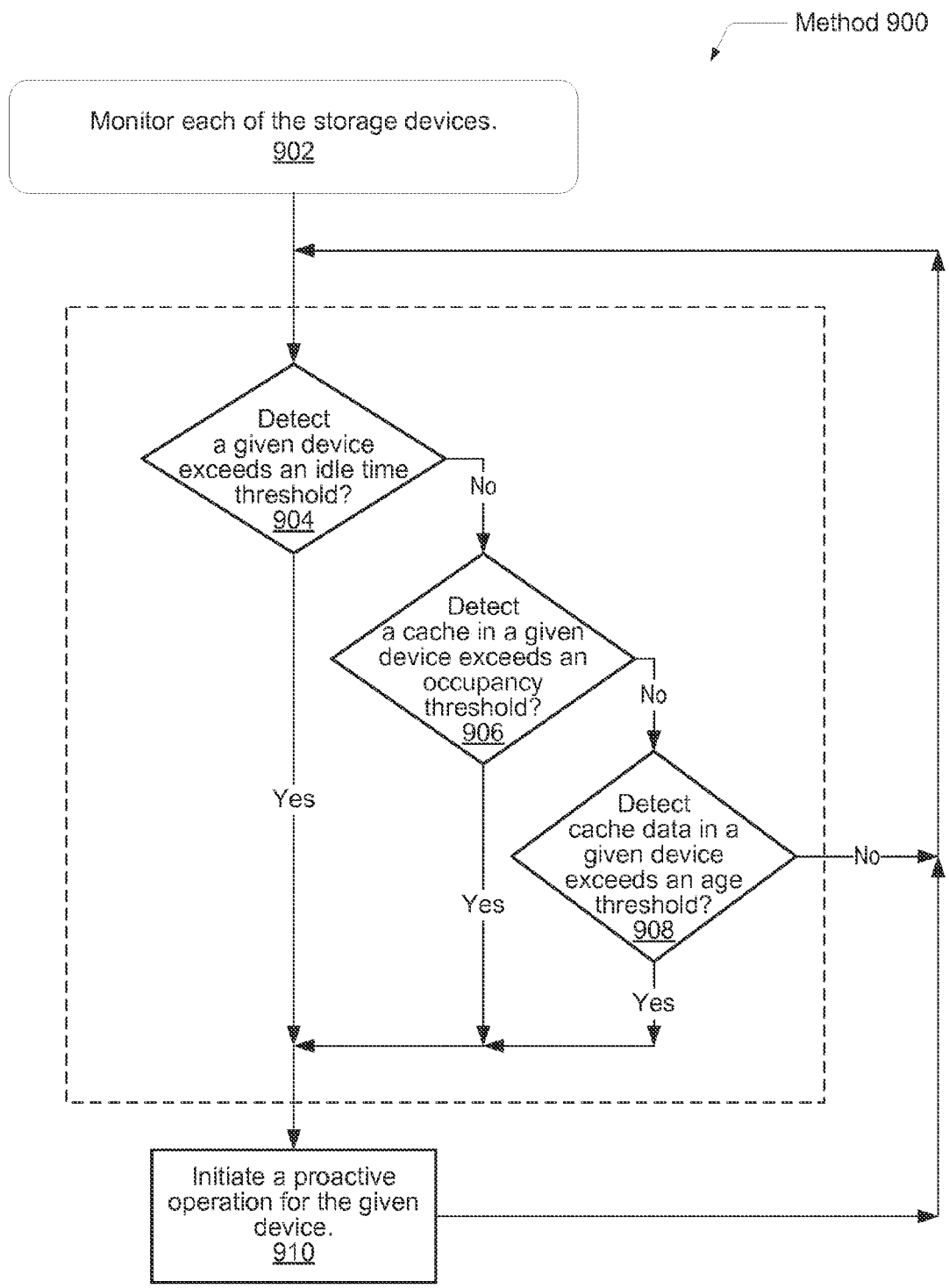
FIG. 9 is a generalized flow diagram illustrating one embodiment of a method for adjusting I/O scheduling to reduce unpredicted variable I/O response times on a data storage subsystem.

Referring now to FIG. 9, another embodiment of a method 900 for adjusting I/O scheduling to reduce unpredicted variable I/O response times on a data storage subsystem is shown. The components embodied in network architecture 100 and data storage arrays 120a-120b described above may generally operate in accordance with method 900. For purposes of discussion, the steps in this embodiment are shown in sequential order. However, some steps may occur in a different order than shown, some steps may be performed concurrently, some steps may be combined with other steps, and some steps may be absent in another embodiment.

In block 902, an I/O scheduler may monitor the behavior of each one of the storage devices. Conditional blocks 904-908 illustrate one embodiment of detecting characteristics of a given device which may affect I/O performance as described above regarding conditional step 306 of method 300. In one embodiment, if the I/O scheduler detects a given device exceeds a given idle time (conditional block 904) or detects a corresponding cache exceeds an occupancy threshold (conditional block 906) or detects a cached data exceeds a data age threshold (conditional block 908), then in block 910, the I/O scheduler may issue a force (proactive) operation to the given storage device. In such a case, the scheduler may predict that an internal cache flush will occur soon and at an unpredictable time. In order to avoid occurrence of such an event, the I/O scheduler proactively schedules an operation to avert the event.

It is noted that aversion of an event as described above may mean the event does not occur, or does not occur at an unpredicted or unexpected time. In other words, the scheduler generally prefers that given events occur according to the scheduler's timing and not otherwise. In this sense, a long latency event occurring because the scheduler scheduled the event is better than such an event occurring unexpectedly. Timers and counters within the scheduling logic 620 may be used in combination with the monitor 610 to perform at least these detections. One example of a force operation issued to the given storage device may include a cache flush. Another example of a force operation may include an erase request. A force operation may be sent from the I/O scheduler to a corresponding queue in the device queue 710 within a corresponding device unit 600 as part of the scheduling.

Figure 10:
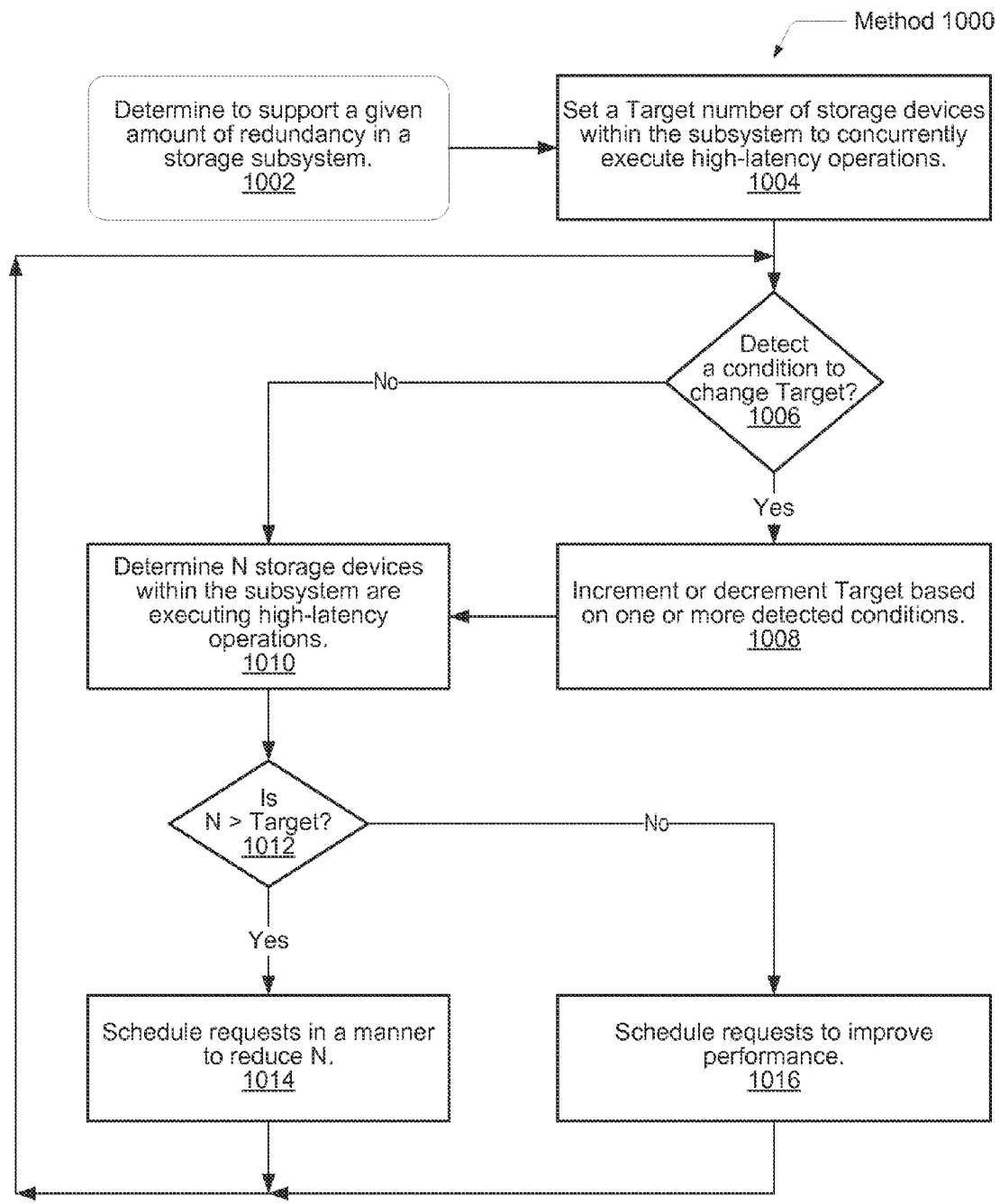
FIG. 10 is a generalized flow diagram illustrating one embodiment of a method for maintaining read operations with efficient latencies on shared data storage.

Referring now to FIG. 10, one embodiment of a method 1000 for maintaining read operations with relatively low latencies on shared data storage is shown. The components embodied in network architecture 100 and data storage arrays 120a-120b described above may generally operate in accordance with method 1000. For purposes of discussion, the steps in this embodiment are shown in sequential order. However, some steps may occur in a different order than shown, some steps may be performed concurrently, some steps may be combined with other steps, and some steps may be absent in another embodiment.

In block 1002, an Amount of redundancy in a RAID architecture for a storage subsystem may be determined to be used within a given device group 173. For example, for a 4+2 RAID group, 2 of the storage devices may be used to store erasure correcting code (ECC) information, such as parity information. This information may be used as part of reconstruct read requests. In one embodiment, the reconstruct read requests may be used during normal I/O scheduling to improve performance of a device group while a number of storage devices are detected to be exhibiting variable I/O response times. In block 1004, a maximum number of devices which may be concurrently busy, or exhibiting variable response time, within a device group is determined. This maximum number may be referred to as the Target number. In one embodiment, the storage devices are SSDs which may exhibit variable response times due to executing write requests, erase requests, or cache flushes. In one embodiment, the target number is selected such that a reconstruct read can still be performed.

In one embodiment, an I/O scheduler may detect a condition which warrants raising the Target number to a level where a reconstruct read is no longer efficient. For example, a number of pending write requests for a given device may reach a waiting threshold (i.e., the write requests have been pending for a significant period of time and it is determined they should wait no longer). Alternatively, a given number of write requests may be detected which have a relatively high-priority which cannot be accumulated for later issuance as discussed above. If the I/O scheduler detects such a condition (conditional block 1006), then in block 1008, the I/O scheduler may increment or decrement the Target based on the one or more detected conditions. For example, the I/O scheduler may allow the Target to exceed the Amount of supported redundancy if an appropriate number of high-priority write requests are pending, or some other condition occurs. In block 1010, the I/O scheduler may determine N storage devices within the device group are exhibiting variable I/O response times. If N is greater than Target (conditional block 1012), then in block 1014, the storage devices may be scheduled in a manner to reduce N. Otherwise, in block 1016, the I/O scheduler may schedule requests in a manner to improve performance. For example, the I/O scheduler may take advantage of the capability of reconstruct read requests as described further below.

Figure 11:
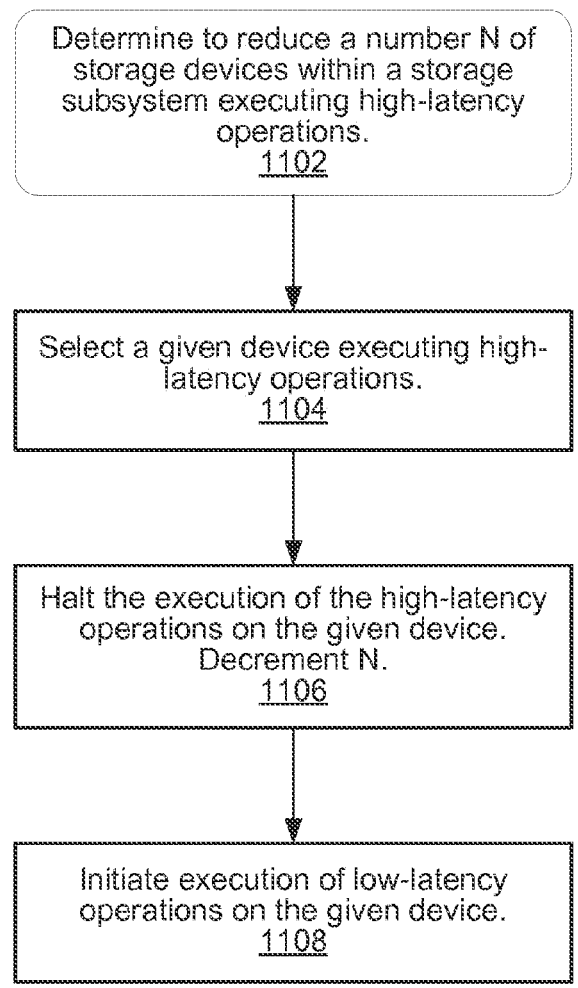
FIG. 11 is a generalized flow diagram illustrating one embodiment of a method for reducing a number of storage devices exhibiting variable I/O response times.

Referring now to FIG. 11, one embodiment of a method 1100 for reducing a number of storage devices exhibiting variable I/O response times is shown. The steps in this embodiment are shown in sequential order. However, some steps may occur in a different order than shown, some steps may be performed concurrently, some steps may be combined with other steps, and some steps may be absent in another embodiment.

In block 1102, an I/O scheduler may determine to reduce a number N of storage devices within a storage subsystem executing high-latency operations which cause variable response times at unpredicted times. In block 1104, the I/O scheduler may select a given device executing high-latency operations. In block 1106, the I/O scheduler may halt the execution of the high-latency operations on the given device and decrement N. For example, the I/O scheduler may stop issuing write requests and erase requests to the given storage device. In addition, the corresponding I/O scheduler may halt execution of issued write requests and erase requests. In block 1108, the I/O scheduler may initiate execution of low-latency operations on the given device, such as read requests. These read requests may include reconstruct read requests. In this manner, the device leaves a long latency response state and N is reduced.

Figure 12:
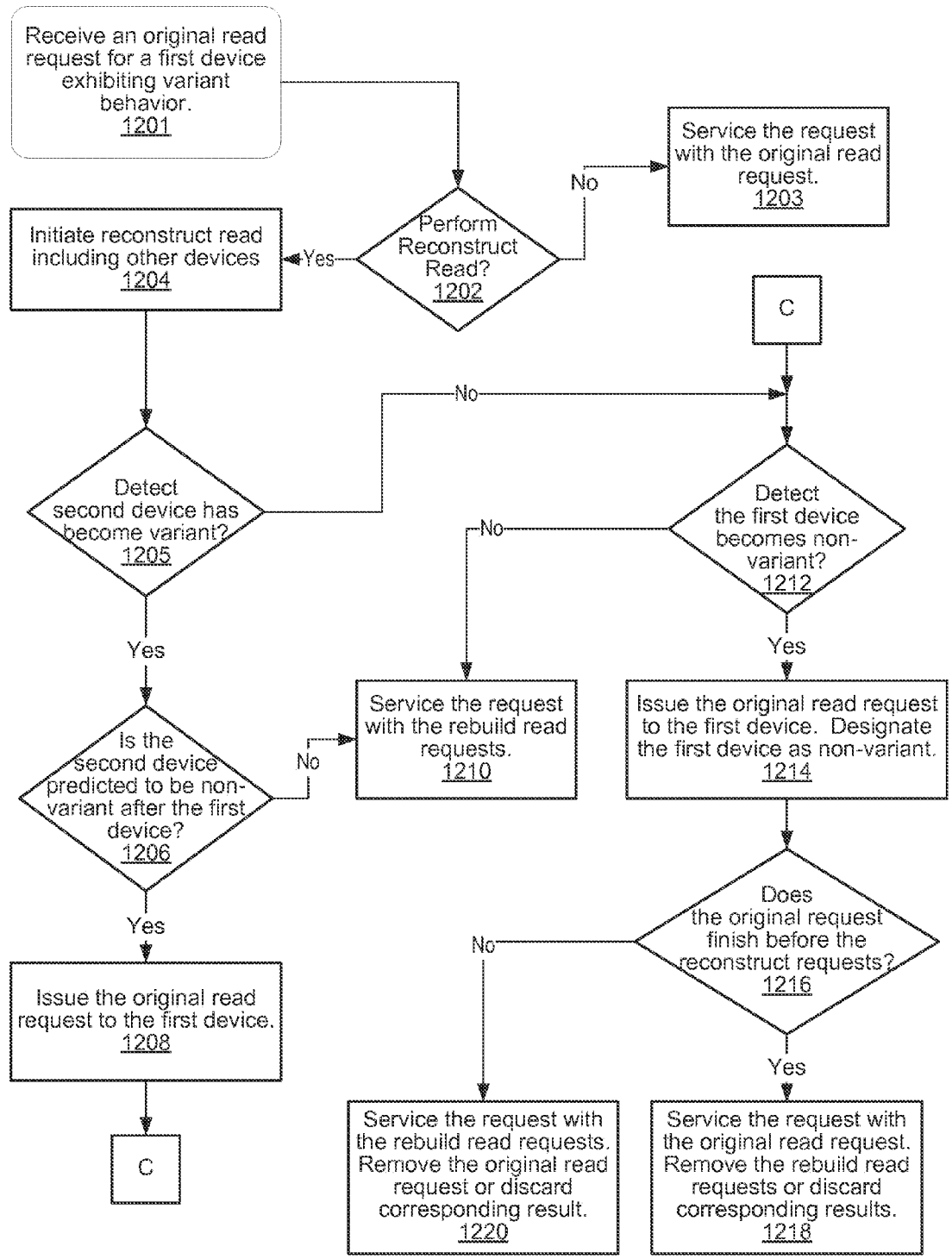
FIG. 12 is a generalized flow diagram illustrating one embodiment of a method for maintaining read operations with efficient latencies on shared data storage.

Turning now to FIG. 12, one embodiment of a method for maintaining read operations with efficient latencies on shared data storage is shown. The components embodied in network architecture 100 and data storage arrays 120a-120b described above may generally operate in accordance with the method. For purposes of discussion, the steps in this embodiment are shown in sequential order. However, some steps may occur in a different order than shown, some steps may be performed concurrently, some steps may be combined with other steps, and some steps may be absent in another embodiment.

The method of FIG. 12 may represent one embodiment of steps taken to perform step 1016 in method 1000. In block 1201, an I/O scheduler receives an original read request directed to a first device that is exhibiting variable response time behavior. The first device may be exhibiting variable response times due to receiving a particular scheduled operation (i.e., a known reason) or due to some unknown reason. In various embodiments what is considered a variable response time may be determined based at least in part on an expected latency for a given operation. For example, based upon characteristics of a device and/or a recent history of operations, a response to a given read may be expected to occur within a given period of time. For example, an average response latency could be determined for the device with a delta determined to reflect a range of acceptable response latencies. Such a delta could be chosen to account for 99% of the transactions, or any other suitable number of transactions. If a response is not received within the expected period of time, then initiation of a reconstruct read may be triggered.

Generally speaking, whether or not a reconstruct read is imitated may be based upon a cost benefit analysis which compares the costs associated with performing the reconstruct read with the (potential) benefits of obtaining the results of the reconstruct read. For example, if a response to an original read request in a given device is not received within a given period of time, it may be predicted that the device is performing an operation that will result in a latency that exceeds that of a reconstruct read were one to be initiated. Therefore, a reconstruct read may be initiated. Such an action may be taken to (for example) maintain a given level of read service performance. It is noted that other factors may be considered as well when determining whether to initiated a reconstruct read, such as current load, types of requests being received, priority of requests, the state of other devices in the system, various characteristics as described in FIGS. 7 and 8, and so on. Further, it is noted that while a reconstruct read may be initiated due to a relatively long response latency for the original read, it is expected that the original read request will in fact complete. In fact both the original read and the reconstruct read may successfully complete and provide results. Consequently, the reconstruct read is not required in order for the original request to be serviced. This is in contrast to a latency that is due to an error condition, such as detecting a latency and some indication of an error that indicates the transaction will (or may) not complete successfully. For example, a device timeout due to an inability to read a given storage location represents a response which is not expected to complete. In such cases, a reconstruct read may be required in order to service the request. Accordingly, in various embodiments the system may effectively include at least two timeout conditions for a given device. The first timeout corresponds to a period of time after which a reconstruct read may be initiated even though not necessarily required. In this manner, reconstruct reads may be incorporated into the scheduling algorithms as a normal part of the non-error related scheduling process. The second timeout, occurring after the first timeout, represents a period of time after which an error condition is believed to have occurred. In this case a reconstruct read may also be initiated due to an expectation that the original read will not be serviced by the device indicating the error.

In view of the above, the I/O scheduler may then determine whether a reconstruct read corresponding to the original read is to be initiated (decision block 1202). The reconstruct read would generally entail one or more reads serviced by devices other than the first device. In determining whether a reconstruct read is to be initiated, many factors may be taken into account. Generally speaking, the I/O scheduler engages in a cost/benefit analysis to determine whether it may be "better" to attempt to service the original read with the first device, or attempt to service the original read by issuing a reconstruct read. As discussed above a number of factors may be considered when determining whether to initiate a reconstruct read. What is "better" in a given situation may vary, may be programmable, and may be determined dynamically. For example, an algorithm may be such that it always favors faster read response times. In such a case, a determination may be made as to whether servicing of the reconstruct read can (or may) complete prior to servicing of the original read by the original device. Alternatively, an algorithm may determine that a reduced system load is favored at a given time. In such a case, the I/O scheduler may choose not to initiate a reconstruct read with its additional overhead—even if the reconstruct read may complete faster than the original read. Still further, a more nuanced balancing of speed versus overhead may be used in such determinations. In various embodiments, the algorithm may be programmable with an initial weighting (e.g., always prefer speed irrespective of loading). Such a weighting could be constant, or could be programmable to vary dynamically according to various conditions. For example, conditions could include time of day, a rate of received I/O requests, the priority of received requests, whether a particular task is detected (e.g., a backup operation is currently being performed), detection of a failure, and so on.

If the scheduler decides not to initiate a reconstruct read, then the read may be serviced by the originally targeted device (block 1203). Alternatively, a reconstruct read may be initiated (block 1204). In one embodiment, the other devices which are selected for servicing the reconstruct read are those which are identified as exhibiting non-variable behavior. By selecting devices which are exhibiting non-variable behavior (i.e., more predictable behavior), the I/O scheduler is better able to predict how long it may take to service the reconstruct read. In addition to the given variable/non-variable behavior of a device, the I/O scheduler may also take in to consideration other aspects of each device. For example, in selecting a particular device for servicing a reconstruct read, the I/O scheduler may also evaluate a number of outstanding requests for a given device (e.g., how full is the device queue), the priority of requests currently pending for a given device, the expected processing speed of the device itself (e.g., some devices may represent an older or otherwise inherently slower technology than other devices), and so on. Further, the scheduler may desire to schedule the reconstruct read in such a way that the corresponding results from each of the devices is returned at approximately the same time. In such a case, the scheduler may disfavor a particular device for servicing a reconstruct read if it is predicted its processing time would differ significantly from the other devices—even if it were much faster than the other devices. Numerous such factors and conditions to consider are possible and are contemplated.

In one embodiment, the reconstruct read requests may inherit a priority level of the original read request. In other embodiments, the reconstruct read requests may have priorities that differ from the original read request. If the I/O scheduler detects a selected second (other) device receiving a corresponding reconstruct read request is now exhibiting variable response time behavior (conditional block 1205) and this second device is predicted to remain variable until after the first device is predicted to become non-variable (conditional block 1206), then in block 1208, the I/O scheduler may issue the original read request to the first device. In one embodiment, timers may be used to predict when a storage device exhibiting variable response times may again provide non-variable response times. Control flow of method 1200 moves from block 1208 to conditional block 1212 via block C. If the second device is not predicted to remain variable longer than the first device (conditional block 1206), then control flow of method 1200 moves to block 1210. In block 1210, the read request is serviced by the issued reconstruct read requests.

If the I/O scheduler detects the given variable device becomes non-variable (conditional block 1212), then in block 1214, the I/O scheduler issues the original read request to the given device. The I/O scheduler may designate the given device as non-variable and decrement N (the number of storage devices detected to provide variable I/O response times). If the original read request finishes before the alternate reconstruct read requests (conditional block 1216), then in block 1218, the I/O scheduler services the read request with the original read request. In various embodiments, the scheduler may remove the rebuild read requests. Alternatively, the reconstruct read requests may complete and their data may simply be discarded. Otherwise, in block 1220, the I/O scheduler services the read request with the reconstruct read requests and may remove the original read request (or discard its returned data).

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated. Additionally, while the above description focuses on networked storage and controller, the above described methods and mechanism may also be applied in systems with direct attached storage, host operating systems, and otherwise.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system comprising:
a data storage medium comprising a plurality of storage devices configured to store data;
and a data storage controller coupled to the data storage medium;
wherein the data storage controller is configured to:
cease processing requests corresponding to a first type of operation on a first storage device;
queue a plurality of requests of a second type of operation;
schedule requests of the second type for immediate processing by the first storage device; and
in response to detecting a second storage device of the plurality of storage devices is exhibiting a relatively long response latency, discontinue processing the requests corresponding to the second type of operation by the first storage device.

2. The computer system as recited in claim 1, wherein operations of the first type correspond to operations with an expected relatively low latency, and operations of the second type correspond to operations with an expected relatively high latency.

3. The computer system as recited in claim 2, wherein operations of the first type correspond to read requests, and operations of the second type correspond to write requests, cache flushes, or trim operations.

4. The computer system as recited in claim 1, wherein said plurality of storage devices are solid state storage devices, and wherein each of said solid state storage devices processes read requests with a relatively low latency, and processes write requests with a relatively high latency.

5. The computer system as recited in claim 1, wherein the plurality of requests corresponding to the second type of operation correspond to write requests, and wherein the storage controller is configured to automatically schedule a dummy read to a given device to follow the write requests.

6. The computer system as recited in claim 1, wherein the plurality of requests corresponding to the second type of operation correspond to write requests, and wherein the storage controller is configured to stream said write requests as a plurality of discrete units of data for processing, the storage controller being able to stop said streaming after any of said units.

7. The computer system as recited in claim 1, wherein the storage controller is configured to stop processing requests corresponding to the first type immediately and begin processing queued requests corresponding to the second type in response to detecting a given condition.

8. The computer system as recited in claim 7, wherein said condition comprises at least one of: a particular number of requests of the second type have been queued, a period of time has elapsed since requests of the second type were processed, and no new requests have been received for a given period of time.

9. A method for use in a computing system, the method comprising:
cease processing requests corresponding to a first type of operation on a first storage device;
queue a plurality of requests of a second type of operation;
schedule requests of the second type for immediate processing by the first storage device; and
in response to detecting a second storage device of the plurality of storage devices is exhibiting a relatively long response latency, discontinue processing the requests corresponding to the second type of operation by the first storage device.

10. The method as recited in claim 9, wherein operations of the first type correspond to operations with an expected relatively low latency, and operations of the second type correspond to operations with an expected relatively high latency.

11. The method as recited in claim 10, wherein operations of the first type correspond to read requests, and operations of the second type correspond to write requests, cache flushes, or trim operations.

12. The method as recited in claim 9, wherein said plurality of storage devices are solid state storage devices, and wherein each of said solid state storage devices processes read requests with a relatively low latency, and processes write requests with a relatively high latency.

13. The method as recited in claim 9, wherein the plurality of requests corresponding to the second type of operation correspond to write requests, and wherein the method comprises automatically scheduling a dummy read to a given device to follow the write requests.

14. The method as recited in claim 9, wherein the plurality of requests corresponding to the second type of operation correspond to write requests, and wherein the method comprises streaming said write requests as a plurality of discrete units of data for processing, the method being able to stop said streaming after any of said units.

15. A non-transitory computer readable storage medium comprising program instructions, wherein when executed by a processing device, the program instructions are operable to:
cease processing requests corresponding to a first type of operation on a first storage device;
queue a plurality of requests of a second type of operation;

schedule requests of the second type for immediate processing by the first storage device; and in response to detecting a second storage device of the plurality of storage devices is exhibiting a relatively long response latency, discontinue processing the requests corresponding to the second type of operation by the first storage device.

16. The computer readable medium as recited in claim 15, wherein operations of the first type correspond to operations with an expected relatively low latency, and operations of the second type correspond to operations with an expected relatively high latency.

\* \* \* \* \*